United States Patent [19]

Keller et al.

[11] Patent Number: 5,237,577

[45] Date of Patent: Aug. 17, 1993

[54] MONOLITHICALLY INTEGRATED FABRY-PEROT SATURABLE ABSORBER

[75] Inventors: Ursula Keller, Highlands; David A. B. Miller, Fair Haven, both of N.J.

[73] Assignee: AT&T Bell Laboratories, Murray Hill, N.J.

[21] Appl. No.: 788,641

[22] Filed: Nov. 6, 1991

[51] Int. Cl.$^5$ .......................... H01S 3/098; H01S 3/10
[52] U.S. Cl. ...................................... 372/11; 359/326; 372/18; 372/21; 372/99
[58] Field of Search ....................... 372/10, 11, 18, 21, 372/25, 99; 359/328, 326

[56] References Cited

U.S. PATENT DOCUMENTS

| | | | |
|---|---|---|---|
| 4,597,638 | 7/1986 | Chemla et al. | 350/354 |
| 4,720,309 | 1/1988 | Deveaud et al. | 372/11 |
| 4,860,296 | 8/1989 | Chemla et al. | 372/44 |
| 4,930,131 | 5/1990 | Sizer, II | 372/18 |
| 5,007,059 | 4/1991 | Keller et al. | 372/18 |

OTHER PUBLICATIONS

S. S. Charschan, *Lasers in Industry*, Van Nostrand Reinhold Co., Chap. I—"Laser Fundamentals," pp. 21–28.
P. Das, *Lasers and Optical Engineering*, Springer-Verlag, Chap. III "Q-Switching and Mode Locking," pp. 240–253.
S. L. Chin, *Fundamentals of laser optoelectronics*, World Scientific, Series in Optics & Photonics—vol. I, pp. 232–234.
H. A. Macleod, *Thin-film optical filters*, 2nd Ed. 1986, Adam Hilger Ltd., Appendix—Characteristics of thin-film materials, pp. 509–511.
Harder et al., *Appl. Phys. Lett.*, vol. 42, No. 9, May 1, 1983, "Passive mode locking of buried heterostructure . . .," pp. 772–774.
Tsang et al., *Appl. Phys. Lett.*, vol. 43, No. 4, Aug. 15, 1983, "Mode-locked semiconductor lasers with gateable . . .," pp. 339–341.
U. Keller et al., *Optics Letters*, vol. 15, No. 23, Dec. 1, 1990, "Coupled-cavity resonant passive mode-locked . . .," pp. 1377–1379.
Lee et al., *Appl. Phys. Lett.*, vol. 58, No. 14, Apr. 8, 1991, "Active-passive mode-locked Nd: YAG laser . . .," pp. 1464–1466.
U. Keller et al., *Optics Letters*, vol. 16, No. 16, Mar. 15, 1991, "Coupled-cavity resonant passive mode-locked Nd:yttrium . . .," pp. 390–392.
Haas et al., *J. Opt. Soc. Am. B.*, vol. 8, No. 6, Jun. 1991, "Theory of coupled-cavity mode locking with . . .," pp. 1252–1258.

*Primary Examiner*—James W. Davie
*Attorney, Agent, or Firm*—Gregory C. Ranieri

[57] ABSTRACT

Saturation intensity and loss of a saturable absorber are substantially independently regulated by positioning the saturable absorber element within a Fabry-Perot etalon defined by first and second reflective elements so that the saturable absorber element responds to light at optical wavelengths in the anti-resonant portion of the Fabry-Perot spectral response, that is, between optical wavelengths corresponding to resonance peaks. The resulting combination of elements is called a Fabry-Perot saturable absorber. Thickness of the saturable absorber element substantially sets the loss of the Fabry-Perot saturable absorber while changes in the reflectivity of the first reflective element onto which the light is incident substantially determines the saturation intensity (degree of nonlinearity) and assists in compensating loss of the saturable absorber element. In one exemplary embodiment, a high reflectivity first reflective element is positioned on the end of the saturable absorber element facing the incident optical radiation while a high reflectivity second reflective element is positioned on the opposite end of the saturable absorber. Dielectric material layers form the first reflective element whereas semiconductor layers form the second reflective element. A plurality of quantum well and barrier layers are employed to form the saturable absorber element.

8 Claims, 2 Drawing Sheets

MONOLITHICALLY INTEGRATED
FABRY-PEROT SATURABLE ABSORBER

TECHNICAL FIELD

This invention relates to saturable absorbing elements and, more particularly, to such elements utilized in combination with a Fabry-Perot etalon.

BACKGROUND OF THE INVENTION

Extremely short duration optical pulses are important for high speed signal processing and communications. Optical pulses in this category are commonly called ultrashort optical pulses and have durations in the picosecond and sub-picosecond range. Ultrashort optical pulses have been obtained by techniques such as passive modelocking wherein a nonlinear element is placed either within the lasing cavity or within a cavity external to the lasing cavity. One such nonliner element is a saturable absorber.

Saturable absorbers are materials which display a change in opacity related to the incident radiation intensity at a particular wavelength. Solids, liquids, and gasses may be used as saturable absorbers based upon the chosen wavelength of operation. The saturable absorber acts as a shutter. It absorber all weak radiation incident upon it. As the intensity of the incident radiation reaches a sufficiently high level called the saturation intensity of the saturable absorber, the incident radiation is permitted to pass through the absorber. In general, the attenuation of the incident radiation caused by the saturable absorber is relatively low because the absorber is saturated into a transparent state at the wavelength for the incident radiation.

In practice, the nonlinearity and loss of a saturable absorber is determined effectively by the cross-section or thickness of the saturable absorber material traversed by the incident radiation. For thicker materials, a larger nonlinearity (saturation intensity) is achieved together with a larger loss for the saturable absorber; for thinner materials, a smaller nonlinearity is achieved together with a smaller amount of loss. Whether used as an intracavity or external cavity element, the saturable absorber exhibits a nonlinearity and loss which are intimately coupled. This limits the design flexibility for known saturable absorbers because there is no available technique for designing the nonlinearity or saturation intensity independent from the loss of the saturable absorber.

SUMMARY OF THE INVENTION

Degree of nonlinearity, that is, saturation intensity, and loss of a saturable absorber are substantially independently regulated by positioning a saturable absorber element within a Fabry-Perot etalon defined by first and second reflective elements so that the saturable absorber element responds to light at optical wavelengths in the anti-resonant portion of the Fabry-Perot spectral response, that is, between optical wavelengths corresponding to resonance peaks. The resulting combination of elements is called a Fabry-Perot saturable absorber. Thickness of the saturable absorber element substantially sets the loss of the Fabry-Perot saturable absorber while changes in the reflectivity of the first reflective element onto which the light is incident substantially determines the saturation intensity (degree of nonlinearity) and assists in compensating loss of the saturable absorber element. The Fabry-Perot saturable absorber has a free spectral range larger than the gain bandwidth of most lasers with which it would be used for modelocking, Q-switching and the like.

In one exemplary embodiment, a high reflectivity first reflective element is positioned on the end of the saturable absorber element facing the incident optical radiation while a similarly high reflectivity second reflective element is positioned on the opposite end of the saturable absorber. Dielectric material layers form the first reflective element whereas semiconductor layers form the second reflective element. A plurality of quantum well and barrier layers are employed to form the saturable absorber element.

In another exemplary embodiment, the second reflective element is formed by depositing a metallic film of the one end of the saturable absorber element.

For the latter exemplary embodiments, the Fabry-Perot saturable absorber is a monolithically integrated structure in which the saturable absorber element and the reflective elements are integrated in a single body. Such a monolithic structure is substantially insensitive to thermal loading, affords significant relaxation of design constraints, and substantially eliminates relative cavity length fluctuations, the latter giving rise to minimum duration optical pulses.

Since the Fabry-Perot saturable absorber includes a high reflectivity element, it is contemplated that the Fabry-Perot saturable absorber be included as a cavity element coupled to a gain medium and a third reflective element on the opposite end of the gain medium from the Fabry-Perot saturable absorber. As such the Fabry-Perot saturable absorber is complete a laser structure which is capable of modelocked operation.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
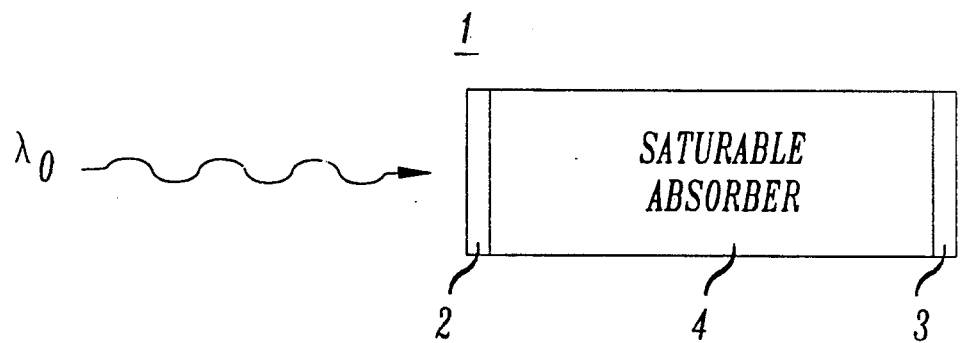
FIG. 1 shows a simplified schematic of a Fabry-Perot saturable absorber.

A Fabry-Perot saturable absorber is described below for performing passive saturable absorption useful for modelocking and Q-switching of lasers. Fabry-Perot saturable absorber 1 as shown in FIG. 1 includes reflective elements 2 and 3 and saturable absorber element 4. The reflective elements are separated in parallel to each other to form a Fabry-Perot etalon. Light is shown incident upon the Fabry-Perot saturable absorber at reflective element 2.

Saturable absorber element 4 comprises a nonlinear material which is contemplated as being absorptive. Nonlinearity of the saturable absorber element is a function of the intensity of the incident optical radiation at or near a particular wavelength, the absorption cross-section, and the material thickness. For an absorptive nonlinearity utilized in accordance with the principles of this invention, the particular wavelength of operation is preferably in the anti-resonant band of the Fabry- Perot etalon. The anti-resonant band is understood to include the range of optical wavelengths between adjacent resonance wavelengths or resonant peak wavelengths for the Fabry-Perot etalon. By using this type of design, it is possible to achieve relaxation of thermal and other design constraints. The thickness of cross-section of saturable absorber element 4 is initially designed to set the loss at a desired value at the Fabry-Perot saturable absorber.

Figure 4:
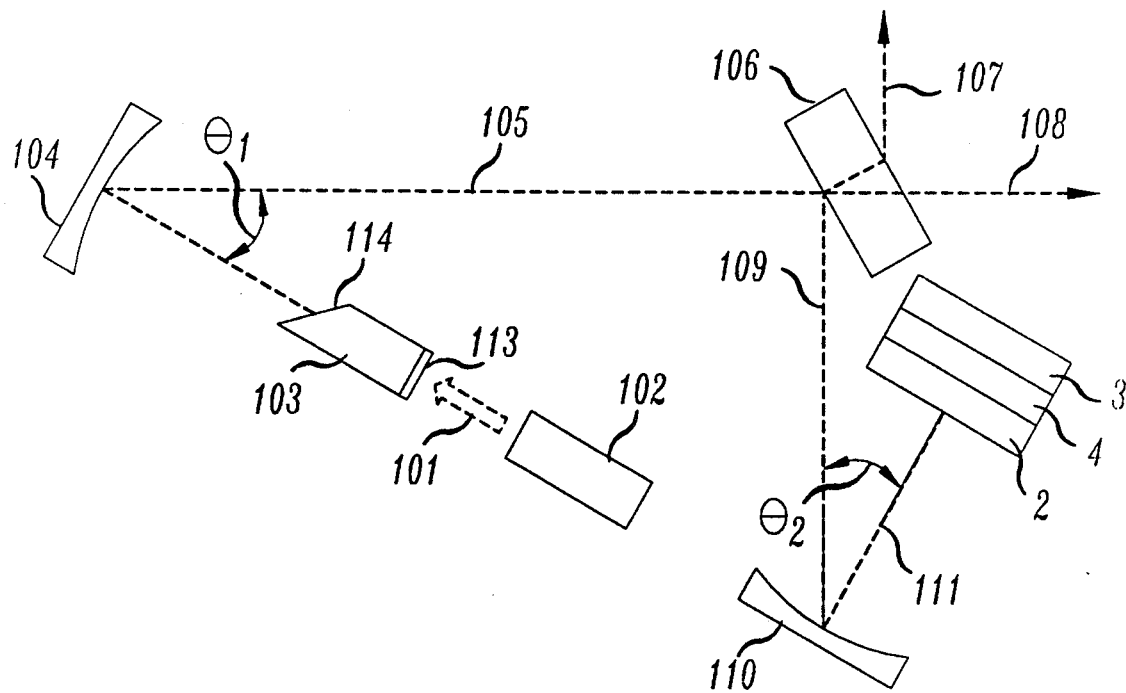
FIG. 4 shows an application of the Fabry-Perot saturable absorber to laser modelocking.

Reflective elements 2 and 3 are contemplated as dielectric or semiconductor or metallic reflectors. Reflectivities for elements 2 and 3 are contemplated as varying over a wide range of values. In most applications, reflective element 2 is the "input" for Fabry-Perot saturable absorber 1 which means that light (optical radiation) from a gain medium or a laser is incident initially upon reflective element 2. When the light is from a gain medium such as a pumped Nd:YLF crystal or the like, reflective element 2 together with another end reflective element as shown in FIG. 4 forms the laser cavity. As such reflective element 2 is required to have a reflectivity at or above 30%. In terms of the Fabry-Perot saturable absorber design, the spacing of the reflective elements and the reflectivity of reflective element 2 are important.

Spacing L of reflective elements 2 and 3 determines the resonance wavelengths or frequencies for the Fabry-Perot etalon defined therebetween. It is noted that the terms "wavelength" and "frequency" are used interchangeably without affecting the understanding of the principles of the present invention. Wavelength ($\lambda$) and frequency (f) are related by the well known equation, $\lambda = c/f$ where c is the speed of light in a vacuum. In order to determine the resonance wavelengths for the Fabry-Perot etalon, it is necessary to compute the equation $m\lambda = 2nL$ where m is an integral number, n is the effective refractive index of the saturable absorber element in the Fabry-Perot etalon and L is the reflective element spacing. The comparable equation for the resonant frequencies is given as $f = m(c/2nL)$. Separation between adjacent resonant wavelengths corresponding to m and m+1 is determined as follows, $$\Delta\lambda = \frac{\lambda^2 \Delta m}{2nL[1 - (\lambda/n)(dn/d\lambda)]},$$

where the terms are as defined previously and $\Delta m$ is the integer difference between m and m+1. This relationship is approximated for the wavelength difference between adjacent resonance wavelengths as $\Delta\lambda \approx \lambda^2/2nL$. Adjacent resonant wavelengths mark the opposite ends on the anti-resonant band of wavelengths while the extent of the anti-resonant band substantially covers $\Delta\lambda$ excluding the resonance wavelengths. Generally at the center of the anti-resonant band, the Fabry-Perot etalon has a maximum reflectivity and a round trip phase shift of an odd-integer multiple of $\pi$ wherein the phase shift includes the penetration depth of both reflective elements 2 and 9.

Figure 2:
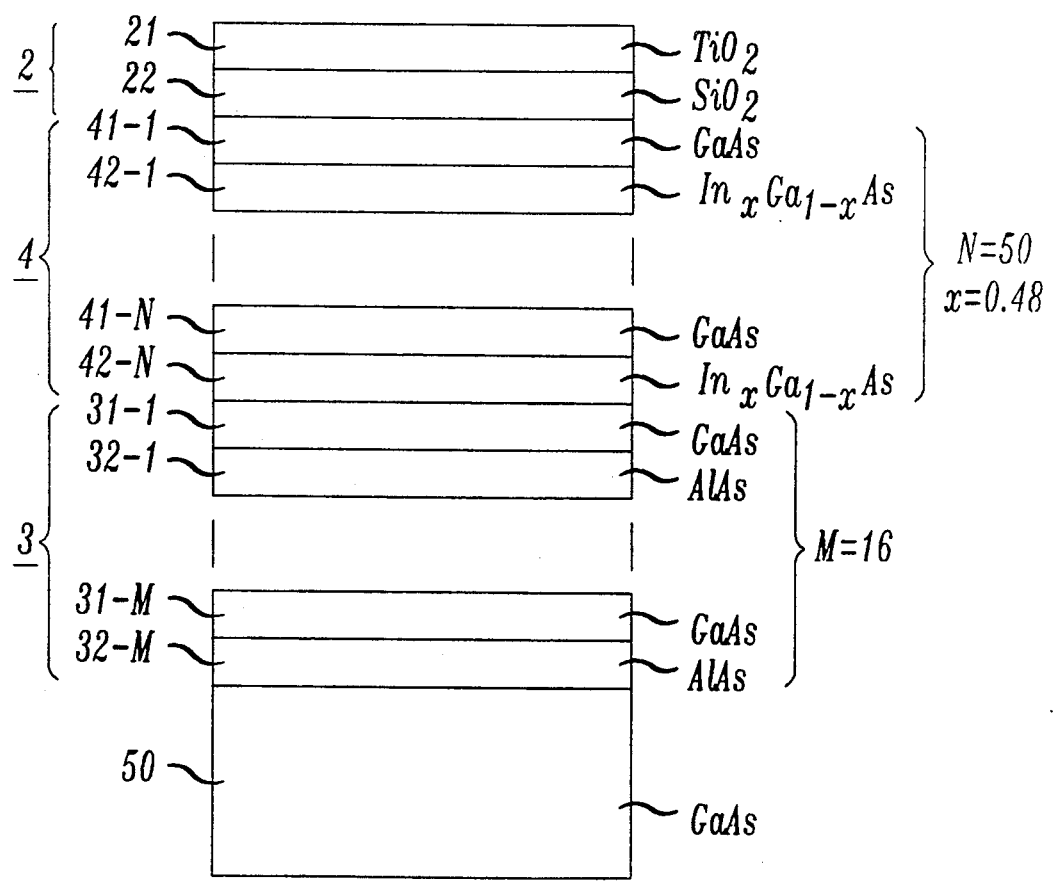
FIG. 2 depicts a cross-sectional view of a dielectric and semiconductor material layer structure for realizing the Fabry-Perot saturable absorber of FIG. 1.

An exemplary realization of the Fabry-Perot saturable absorber from FIG. 1 is shown in cross-sectional view in FIG. 2. The Fabry-Perot saturable absorber in FIG. 2 comprises a semiconductor multiple quantum well structure as saturable absorber element 4 positioned between reflective elements 2 and 3. The semiconductor multiple quantum well structure is designed to have a bandgap in the quantum well substantially at or near the wavelength of the light incident on the Fabry-Perot saturable absorber. For the example shown in FIG. 2 and described below, the bandgap of the quantum well layers is selected to correspond to 1.047 $\mu$m which is the light emission wavelength for a Nd:YLF crystal laser which may be used to radiate light incident on reflective element 2 of the Fabry-Perot saturable absorber.

Saturable absorber element 4 shown in FIG. 2 comprises an InGaAs/GaAs multiple quantum well structure. Barrier layers 41-1 through 41-N consist of 48 Å thick GaAs while quantum well layers 42-1 through 42-N 82 Å thick $In_xGa_{1-x}As$, where the In concentration x is approximately 0.48 to achieve the quantum well energy bandgap close to the wavelength of incident light on the saturable adsorber. There are fifty (N=50) periods of the quantum well/barrier pairs grown by epitaxial growth techniques over a semiconductor GaAs/AlAs reflector on a GaAs substrate. The number of periods employed together with the thickness of each layer determine the spacing between the reflective elements of the Fabry-Perot etalon. In accordance with the principles of the invention, the spacing is set for the wavelength of incident light, that is, the wavelength for which the saturable absorber element 4 responds, to be in the anti-resonant band of the Fabry-Perot etalon. In the example, the spacing is approximately 0.65 $\mu$m. For the layer thicknesses, number of periods, energy bandgap of the quantum well layers selected, the wavelength of the incident light is near the center of the anti-resonant band substantially at the point of maximum reflectivity for the Fabry-Perot etalon between two adjacent resonance peaks of the Fabry-Perot etalon.

No intentional doping is performed on this structure although doping of the semiconductor layers is contemplated for alternative embodiments. Epitaxial growth of the quantum well structure is performed by low temperature molecular beam epitaxy (MBE) at approximately 380° C. This type of growth environment is utilized to reduce carrier lifetime and thereby achieve a relatively fast saturable absorber element 4. Carrier lifetime for the particular example described above is determined to be approximately 25 ps. Since low temperature growth increases the amount of unsaturable loss in the absorber element, it is understood that the Fabry-Perot saturable absorber as described herein exhibits less sensitivity to these unsaturable losses so that fast saturable absorber materials can be employed in the Fabry-Perot saturable absorber. While low temperature MBE has been described above for realizing an exemplary saturable absorber element, other epitaxial growth techniques such as vapor phase epitaxy, liquid phase epitaxy and standard MBE are contemplated for realizing the Fabry-Perot saturable absorber and its constituent elements.

Reflective element 3 is shown in FIG. 2 as a stack of sixteen (M=16) periods of GaAs/AlAs layer pairs. The optical thickness of each layer is substantially equal to a quarter-wave thickness ($\lambda/4n$, where n is the effective refractive index for the particular layer) at the wavelength for the incident light. In the example, the thickness of GaAs layers 31-1 through 31-M is approximately 764 Å while the thickness of AlAs layers 32-1 through 32-M is approximately 905 Å. Standard MBE growth at 640° C. is performed to realize reflective element 3 on GaAs substrate 50. The reflectivity of element 3 is high, approximately 96%, for the exemplary embodiment at the wavelength of the incident light. For the embodiment shown, a high reflectivity for element 3 is preferred to avoid thermal effects from damaging the structure.

Reflective element 2 is shown in FIG. 2 as a stack of dielectric layers 21 and 22. Layers 21 and 22 are deposited $TiO_2$ and $SiO_2$, respectively, on the multiple quantum well structure of saturable absorber element 4. Reflectivity to element 2 in this example is approximately 98% at the wavelength of incident light. Techniques for depositing dielectric layers 21 and 22 and for determining the appropriate layer of thicknesses to achieve to desired reflectivity are well-known to persons skilled in the art and are not described herein. While element 2 is described in the example as comprising dielectric layers, it is understood that semiconductor layers having a similarly high reflectivity may be substituted therefor.

Figure 3:
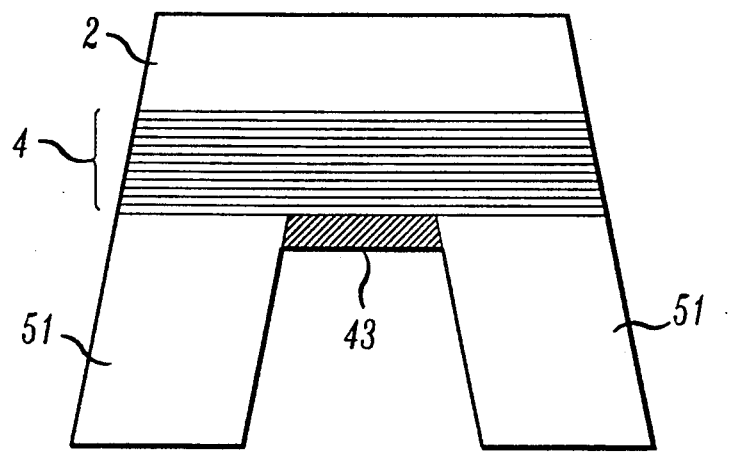
FIG. 3 is an alternative embodiment of the Fabry-Perot saturable absorber shown in FIG. 2.

An alternative embodiment of the Fabry-Perot saturable absorber is shown in FIG. 3. In this embodiment, elements 2 and 4 are understood to be as described above. Substrate 51 comprising GaAs is shown in the cross-sectional view as being etched to expose the end layer of saturable adsorbable element 4. From FIG. 2, the exposed end layer is layer 42-N comprising InGaAs. In order to complete the Fabry-Perot saturable absorber structure, metallic layer 43 comprising, for example, a thin deposited or evaporated layer of gold is employed as reflector element 3.

Embodiments of the Fabry-Perot saturable absorber shown in FIGS. 2 and 3 have reflective elements monolithically integrated with the saturable absorber element. Monolithic integration of these elements prevents relative cavity length fluctuations and, therefore, optical wavelength fluctuations when the Fabry-Perot saturable absorber is used as a cavity element to mode lock a laser. Also, the monolithically integrated Fabry-Perot saturable absorber structure affords a minimum cavity length difference which, when the Fabry-Perot saturable absorber is used in conjunction with a laser gain medium, allows pulses of minimum duration to be realized.

FIG. 4 shows an exemplary laser in which the Fabry-Perot saturable absorber is combined with a gain medium and reflector to provide continuous wave (cw) modelocking and Q-switching. The laser cavity shown in FIG. 4 is an end pumped, standing wave, folded cavity. Gain medium 103 is a 5 mm Nd:YLF crystal rod having the end surface normal to the main access of the rod coated for high reflection at the lasing wavelength thereby forming reflective element 113. Antireflection coating is also applied to this end of gain medium 103 wherein the antireflection coating has a characteristic wavelength corresponding to that of being 101 from pump source 102. The opposite end of gain medium 103 is cut at the Brewster angle to form N surface 114. In this example, the lasing wavelength of gain medium 103 is approximately 1.047 µm and the wavelength of pump light 101 from pump source 102 is approximately 798 mm because pump source 102 comprises a cw Ti:Sapphire laser.

Light from gain medium 103 is radiated from surface 114 to curved highly reflecting mirror 104 having a 200 mm radius of curvature. Mirror 104 is used to reduce for laser cavity mode diameter to an estimated spot size of 100 µm × 70 µm which is small enough to ensure a low pump power threshold. Beam 105 is directed off mirror 104 toward output coupler 106. Cavity output coupler 106 comprises a flat turning mirror having a 45 degree angle of incidence and 1% transmission to provide total output coupling of 2% via output beams 107 and 108. From cavity output coupler 106, beam 109 is focused onto the Fabry-Perot saturable absorber 112 by highly reflective curve mirror 110 having a radius of curvature of approximately 100 mm. The estimated spot radius of beam 111 as reflected by mirror 110 is approximately 40 µm. Fabry-Perot saturable absorber forms the other end mirror of the standing wave cavity, that is, the cavity defined by reflective elements 2 and 113. It should be noted that folding angles, $\theta_1$ of approximately 16° and $\theta_2$ of approximately 12° substantially compensates astigmatism of the Brewster angle surface 114 of the Nd:YLF gain medium 103.

Fabry-Perot saturable absorber 112 is the structure previously described in relation to FIG. 2. One important benefit of the Fabry-Perot saturable absorber design is that its free spectral range, which is approximately 100 nm for the structure in FIG. 2, is significantly larger than the gain bandwidth of the Nd:YLF laser which is approximately 0.6 nm. In view of this design, the fabry-Perot saturable absorber relaxes many design constraints in the realization of a modelocked laser and eliminates sensitivities to thermal loading.

The modulated laser structure shown in FIG. 4 utilizing the Fabry-Perot saturable absorber is viewed as a coupled cavity structure where the main laser cavity is defined between reflective elements 2 and 113 and where the external nonlinear cavity including the saturable absorber is the Fabry-Perot saturable absorber 112. Both coupled cavities overlap interferometrically except for the saturable absorber element. This corresponds to a monolithic coupled cavity because any cavity length fluctuations in either cavity are identical in both cavities due to the presence of the Fabry-Perot saturable absorber. Cavity length detuning is minimized which, in turn, minimizes the duration of output optical pulses. As a result of the condition that the lasing wavelength of the coupled cavity is required to be both an axial mode of the main (gain medium) cavity and the wavelength for maximum reflectivity of the coupled cavity, the period of the coupled cavity structure is given as $c/2\delta L$ which corresponds to the free spectral range of a Fabry-Perot etalon having a thickness $\delta L$, where $\delta L$ is the cavity length detuning between the two coupled cavities. Fabry-Perot saturable absorber 112 corresponds to the Fabry-Perot etalon having the desired thickness $\delta L$.

When the Fabry-Perot saturable absorber is utilized in a coupled cavity mode locking laser structure, such as shown in FIG. 4, the thickness of saturable absorber element 4 is judiciously set to realize a Fabry-Perot etalon whose free spectral range is larger than the gain bandwidth of the gain medium in order to prevent pulse width limitations by the Fabry-Perot etalon. For the example shown in FIG. 4 and described above, the free spectral range of the etalon is larger that the gain bandwidth of the Nd:YLF gain medium.

For the exemplary laser embodiment shown in FIG. 4, stable, self-starting, mode locked pulses were achieved. The output pulses had a $sech^2$ pulse shape with a duration of 4 ps at a repetition rate of approximately of 220 MHZ determined by the round-trip time of the cavity. This laser structure also exhibited a self-induced Q-switching characteristic with a pulse duration of 1.4 µseconds at a repetition rate of 120 kHz, corresponding to the relaxation frequency of the Nd:YLF gain medium. Average output power for pulses from the laser in FIG. 4 was 480 mW in response to 1.4 W pump power from a cw Ti:sapphire laser at a wavelength of 798 nm.

Advantageously, the Fabry-Perot saturable absorber operates as a cavity saturable absorber at a particular wavelength for which it is possible to independently design the non-linearity, the loss, and the non-linearity speed (carrier lifetime) by choosing appropriate values for the reflectivity of reflective element 2, the thickness of saturable absorber element 4, and growth parameters relating to fabrication of the saturable absorber element. For example, growth temperature in an epitaxial growth process can be used to achieve a desired response time for the saturable absorber element. The desired response time corresponds to the carrier lifetime. With respect to design of the non-linearity, it is understood that for semiconductor materials the wavelength of operation determines the absorber cross-section and saturation intensity which determines the non-linearity.

Other contemplated embodiments of the Fabry-Perot saturable absorber which are deemed obvious in view of the description above include the use of bulk semiconductor material for the saturable element. Also, it is contemplated that a broadband saturable absorber response is provided by compositionally grading the semiconductor saturable material or, in the case of semiconductor quantum wells, by varying the bandgap energy of successive wells from wide bandgap near reflective element 2 to narrow bandgap near reflective element 3. Alternatively, the thickness of quantum well layers and/or barrier layers can be varied to provide effective grading and therefore broadband operation. These embodiments have not been shown in the FIGS. but are, after reading this specification, believed to be within the ordinary skill of persons in this field.

It is understood that, while the material system GaAs/InGaAs is described above for fabricating the saturable absorber element other material combinations may be selected from other semiconductor Group III-V systems such as GaAs/AlGaAs, InGaAs/InGaAlAs, InGaAs/InAlAs, GaAs/AlAs, GaAsSb/GaAlAsSb and InGaAsP/InP to achieve saturable absorption at different desired wavelengths. In these semiconductor systems, the layers may be lattice-matched to suitable GaAs or InP substrates. Mismatching is also contemplated wherein strained layers are grown over the substrate material. Finally, extension of the device structures is also contemplated to semiconductor compounds in Group II-VI and Group IV.

What is claimed is:

1. Optical apparatus comprising, first and second reflective elements being spaced apart to form a Fabry-Perot etalon therebetween, said Fabry-Perot etalon being characterized by a plurality of optical frequencies each frequency corresponding to a resonant condition, and semiconductor material having a nonlinear optical absorption substantially at a predetermined optical frequency and being positioned between said first and second reflective elements, said predetermined optical frequency being between any two adjacent optical frequencies in said plurality of optical frequencies so that said predetermined optical frequency occurs substantially at an optical frequency corresponding to an anti-resonant condition for said Fabry-Perot etalon.

2. The optical apparatus as defined in claim 1 wherein said first and second reflective elements are monolithically integrated with said semiconductor material.

3. The optical apparatus as defined in claim 2 wherein said semiconductor material includes, first layers of material having a first bandgap energy, and second layers of material having a second bandgap energy, said first bandgap energy being larger than said second bandgap energy, said first layers alternated with said second layers to form a multiple quantum well structure, the thickness of the second layers being less than 500Å.

4. The optical apparatus as defined in claim 3 wherein said first layers comprise GaAs and said second layers comprise a composition of InGaAs.

5. The optical apparatus as defined in claim 2 wherein said semiconductor material includes bulk semiconductor material.

6. The optical apparatus as defined in claim 2 wherein said second reflective element comprises, third layers of semiconductor material having an optical thickness of one-quarter wavelength at said predetermined optical frequency, and fourth layers of semiconductor material having an optical thickness of one-quarter wavelength at said predetermined optical frequency, said third and fourth layers being alternated with each other to form said second reflective element.

7. The optical apparatus as defined in claim 6 wherein the said third layers include GaAs and said fourth layers include AlAs.

8. The optical apparatus as defined in claim 6 wherein said first reflective element includes a fifth layer comprising $TiO_2$ and a sixth layer comprising $SiO_2$, said sixth layer being adjacent to said semiconductor material having said nonlinear optical absorption.

* * * * *